United States Patent
Auzinger et al.

(10) Patent No.: US 9,528,811 B2
(45) Date of Patent: Dec. 27, 2016

(54) MEASUREMENT DEVICE AND MEASUREMENT METHOD FOR MEASURING THE THICKNESS OF A PANEL-SHAPED OBJECT

(71) Applicant: TRUMPF Maschinen Austria GmbH & Co. KG., Pasching (AT)

(72) Inventors: Michael Auzinger, Linz (AT); Thomas Denkmeier, Traun (AT); Alfred Haselboeck, Rohrbach (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 97 days.

(21) Appl. No.: 14/439,739

(22) PCT Filed: Nov. 6, 2013

(86) PCT No.: PCT/AT2013/050209
§ 371 (c)(1),
(2) Date: Apr. 30, 2015

(87) PCT Pub. No.: WO2014/071430
PCT Pub. Date: May 15, 2014

(65) Prior Publication Data
US 2015/0292853 A1    Oct. 15, 2015

(30) Foreign Application Priority Data
Nov. 8, 2012   (AT) ................. A 50496/2012

(51) Int. Cl.
*G01B 5/06*    (2006.01)
*G01B 7/06*    (2006.01)

(52) U.S. Cl.
CPC . *G01B 5/06* (2013.01); *G01B 7/06* (2013.01); *G01B 2210/44* (2013.01)

(58) Field of Classification Search
CPC .......... G01B 5/06; G01B 7/06; G01B 2210/44
(Continued)

(56) References Cited

U.S. PATENT DOCUMENTS 2,856,582 A * 10/1958 Anderson ................ G01B 7/06
  310/308
4,464,840 A *  8/1984 Newland ................. G01B 7/06
  33/552

(Continued)

FOREIGN PATENT DOCUMENTS

CN    201434677 Y    3/2010
DE    4 038 164 A1   7/1991
(Continued)

OTHER PUBLICATIONS

International Search Report of PCT/AT2013/050209, mailed Feb. 14, 2014.

*Primary Examiner* — Christopher Fulton
(74) *Attorney, Agent, or Firm* — Collard & Roe, P.C.

(57) ABSTRACT

A measurement device (100 . . . 103) for measuring the thickness (d) of a plate-shaped object (7) is indicated, which comprises a first measurement sensor (21 . . . 23) for being set onto a first surface (9) of the plate-shaped object (7) and a second to fourth measurement sensor (31 . . . 53) for being set onto a second surface (10), opposite to the first surface (9) of the plate-shaped object (7). Furthermore, the measurement device (100 . . . 103) comprises means for calculating the thickness (d) of the plate-shaped object (7), using the positions (81 . . . 84) at which the measurement sensors (21 . . . 53) touch the plate-shaped object (7). Furthermore, a measurement method for measuring the thickness (d) of a plate-shaped object (7) is also indicated.

8 Claims, 3 Drawing Sheets

Figure 1:
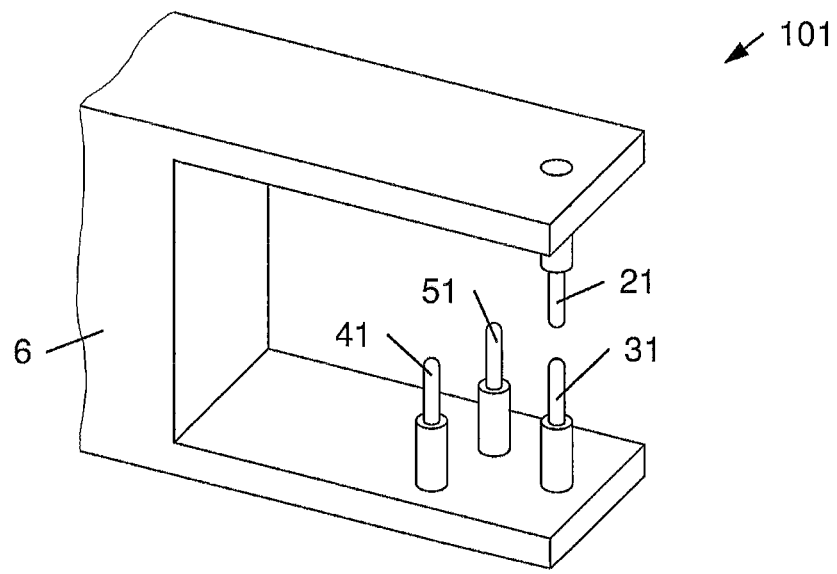

(58) Field of Classification Search
USPC .................................................. 33/783
See application file for complete search history.

(56) References Cited

U.S. PATENT DOCUMENTS

| | | | | |
|---|---|---|---|---|
| 4,509,265 A * | 4/1985 | Donaldson | ............... | B23Q 3/18 |
| | | | | 250/559.22 |
| 5,584,199 A * | 12/1996 | Sartorio | ............... | B21D 5/0209 |
| | | | | 72/18.1 |
| 6,038,779 A * | 3/2000 | Lee | ............... | G01B 5/06 |
| | | | | 33/1 M |
| 6,073,360 A * | 6/2000 | Struble | ............... | G01B 5/14 |
| | | | | 33/783 |
| 6,141,883 A * | 11/2000 | Mitchell | ............... | B65H 43/00 |
| | | | | 271/274 |
| 6,796,155 B2 * | 9/2004 | Koyama | ............... | B21D 5/02 |
| | | | | 72/20.1 |
| 7,199,884 B2 | 4/2007 | Jasinski et al. | | |
| 8,099,256 B2 * | 1/2012 | Krasuski | ............... | G01B 5/02 |
| | | | | 177/25.11 |
| 8,554,503 B2 | 10/2013 | Schallmoser et al. | | |
| 9,212,890 B2 * | 12/2015 | Dai | ............... | G01B 5/02 |
| 2005/0039342 A1 | 2/2005 | Kirstine | | |
| 2012/0170059 A1 | 7/2012 | Typpo et al. | | |
| 2015/0153148 A1* | 6/2015 | Angerer | ............... | B21D 5/0209 |
| | | | | 72/379.2 |

FOREIGN PATENT DOCUMENTS

| | | |
|---|---|---|
| DE | 40 08 149 A1 | 9/1991 |
| DE | 10 2009 011 122 A1 | 11/2009 |
| JP | H07 280526 A | 10/1995 |
| JP | H11 271005 A | 10/1999 |
| WO | 2006/068949 A1 | 6/2006 |
| WO | 2011/000665 A1 | 1/2011 |

* cited by examiner

MEASUREMENT DEVICE AND MEASUREMENT METHOD FOR MEASURING THE THICKNESS OF A PANEL-SHAPED OBJECT

CROSS REFERENCE TO RELATED APPLICATIONS

This application is the National Stage of PCT/AT2013/050209 filed on Nov. 6, 2013, which claims priority under 35 U.S.C. §119 of Austrian Application No. A 50496/2012 filed on Nov. 8, 2012, the disclosure of which is incorporated by reference. The international application under PCT article 21(2) was not published in English.

The invention relates to a measurement device for measuring a thickness of a plate-shaped object, comprising a first measurement sensor that is set up for measuring a first position of a contact point of the first measurement sensor with a first surface of the plate-shaped object. Furthermore, the invention relates to a method for measuring the thickness of a plate-shaped object, in which a first position of a contact point of a first measurement sensor with the first surface of the plate-shaped object is measured.

A measurement device as well as a measurement method of the stated type are fundamentally known. In this connection, the object to be measured is touched on one side with a measurement sensor, and its thickness is determined on the basis of the difference between the position of the first contact point and a contact surface of the object to be measured. The object to be measured lies on this contact surface with a second surface that lies opposite the first surface. For example, the measurement sensor can be brought up to the said contact surface, in order to establish a zero point. If the sensor is then brought up to the first surface of the plate-shaped object, which is lying on this contact surface, its thickness can be easily determined. For example, DE 40 08 149 A1 discloses a CNC-controlled folding apparatus for plate-shaped workpieces, having a punch that can be activated by means of setting elements, which apparatus has a thickness measurement device that can be moved along the circumference and at different distances from the circumference of a workpiece, in order to achieve uniform forming at different thickness of the workpiece, which device is connected with the computer of the apparatus, to control the setting elements of the punch.

This measurement device and this measurement method are simple and as such yield reliable values, but only with certain prerequisites. One of these is that the plate-shaped object must actually lie on the contact surface in the region of the first contact point, in other words that physical contact must be present between the second surface of the plate-shaped object and the contact surface. However, the contact surface is not allowed to be excessively pressed into the second surface, because this would also distort the measurement. A further prerequisite is that the movement direction of a linearly displaceable measurement plunger is oriented in a normal line relative to the first surface of the plate-shaped object, or that an axis of rotation of a measurement lever mounted so as to rotate must be oriented parallel with this first surface. If these prerequisites are not met, the measurement result is necessarily distorted.

In this connection, US 2005/0039342 A1 discloses a method and an arrangement for measuring the thickness and the curvature of substrates, for example of circuit boards. For this purpose, the arrangement has a pair or multiple pairs of linear measurement devices disposed opposite one another, for example measurement sensors. Using this arrangement, the thickness and the curvature of a substrate disposed between the linear measurement devices can be determined.

DE 10 2009 011 122 A1 furthermore discloses a method for calibration of a thickness measurement device having at least one path measurement sensor that works in contact-free or scanning manner. First, recording of at least two independent measurement values takes place by means of the at least one path measurement sensor, at at least two predeterminable locations on a first surface of the reference object. Then, determination of the tilting or spatial position of the reference object in the measurement field takes place from the recorded measurement values. Then, recording of a further measurement value by means of the at least one path measurement sensor takes place at a further location, located in the measurement direction, on a second surface opposite to the first surface or on a surface region of the reference object opposite to the first surface, in order to determine a thickness value of the reference object in the measurement direction. Finally, calculation of the difference between the calculated thickness value and the known thickness of the reference object takes place, to obtain position-dependent or tilting-dependent or location-dependent correction values in the partial region or measurement field, in order to be able to compensate geometric errors and/or non-linearities of the at least one path measurement sensor in the partial region or measurement field during a thickness measurement.

JP 07280526 A furthermore discloses a thickness measurement method for steel sheets, using a laser measurement device, which particularly allows measuring the thickness and tilting of the steel plate. For this purpose, three laser measurement devices are disposed on one side of the steel plate, one laser measurement device is disposed on the other side. In this connection, the three laser measurement devices are spaced apart from one another in a movement direction of the steel plate.

WO 2011/000665 A1 furthermore discloses a method for contact-free determination of the thickness of a material web, particularly a fiber material web, by means of a sensor arrangement that comprises at least two optical measurement units, between which the material web is passed. In this connection, optical measurement units disposed on opposite sides of the material web determine their distance from the material web, in each instance. As a result, the thickness of the material web can be determined, as can the tilt angle of the measurement plates relative to the material web and/or an offset between the optical measurement units or their measurement plates disposed on opposite sides of the material web.

WO 2006/068949 A1 finally discloses a method for contact-free measurement of the thickness of moving woven fabrics or paper sheets. For this purpose, two sensors spaced apart from one another are provided, between which the woven fabric is passed, and with which the thickness of the woven fabric can be determined. Using the first sensor, a pattern is also projected onto the top surface of the woven fabric, with which the orientation or inclination of the woven fabric can be determined.

It is therefore a task of the invention to indicate an improved measurement device and an improved measurement method. In particular, the correctness of a measurement result is not supposed to depend on whether the plate-shaped object lies correctly on a contact surface and is oriented correctly.

This task of the invention is accomplished with a measurement device of the type stated initially, additionally comprising
- a second measurement sensor that is set up for measuring a second position of a contact point of the second measurement sensor with a second surface of the plate-shaped object, which surface lies opposite the first surface,
- a third measurement sensor that is set up for measuring a third position of a contact point of the third measurement sensor with the second surface of the plate-shaped object,
- a fourth measurement sensor that is set up for measuring a fourth position of a contact point of the fourth measurement sensor with the second surface of the plate-shaped object, wherein the positions of the contact points of the second, third, and fourth measurement sensor are spaced apart from one another, and
- a computer unit that is set up for calculating the thickness of the plate-shaped object on the basis of the measured first to fourth position, corresponding to the normal distance of the first surface from the second surface.

Furthermore, the task of the invention is accomplished with a method of the type stated initially, additionally comprising the steps
- measuring a second position of a contact point of a second measurement sensor with a second surface of the plate-shaped object, which lies opposite the first surface,
- measuring a third position of a contact point of a third measurement sensor with the second surface of the plate-shaped object,
- measuring a fourth position of a contact point of a fourth measurement sensor with the second surface of the plate-shaped object, wherein the positions of the contact points of the second, third, and fourth measurement sensor are spaced apart from one another, and
- calculating the thickness of the plate-shaped object on the basis of the measured first to fourth position, corresponding to the normal distance of the first surface from the second surface.

Using the said method, a very precise determination of the thickness of a plate-shaped object is possible, because rotation or tilting of the measurement device relative to the plate-shaped object is taken into consideration. In conventional measurement methods, in contrast, in such a case an overly great thickness is indicated. Also, the correctness of the measurement result does not depend on whether or not the plate-shaped object is lying correctly on a contact surface.

A "measurement sensor" within the scope of the invention is understood to be any measurement device that touches the body to be measured while measuring it, and, in this connection, indicates the position of the contact point in at least one spatial direction. In particular, a "measurement sensor" is understood to be an apparatus having a linearly displaceable measurement plunger or also having a measurement lever mounted so as to rotate.

Further advantageous embodiments and further developments of the invention are evident from the dependent claims and from the description, looking at the figures.

In an advantageous variant, the measurement device comprises a fork-shaped holder, wherein the first measurement sensor is disposed on a first fork extension and the second to fourth measurement sensor are disposed on a second fork extension. By means of the fork, the measurement sensors are disposed in a predetermined spatial position relative to one another. The normal distance of the first surface from the second surface can therefore be calculated well.

It is advantageous if the measurement sensors each have a linearly displaceable measurement plunger, the displacement directions of which are oriented parallel to one another. As a result, the first to fourth position can be directly read off from the displacement of the measurement plungers.

It is furthermore advantageous if the axes of the measurement plungers of the first and the second measurement sensor lie on a straight line. With the prerequisite, that the first surface or the second surface of the plate-shaped object to be measured is oriented with a normal line to the said straight line, the thickness of the said object can be calculated directly from the difference between the first and the second position.

It is also advantageous if the computer unit is set up for
- calculating the distance between the first and the second position,
- calculating the angular position of the second surface relative to a straight line that runs between the first position and the second position, on the basis of the measured second to fourth position, and
- calculating the normal distance of the first surface from the second surface on the basis of the distance between the first and the second position as well as the said angular position.

Analogously, it is advantageous if
- the distance between the first and the second position is calculated,
- the angular position of the second surface relative to a straight line that runs between the first position and the second position is calculated on the basis of the measured second to fourth position,
- the normal distance of the first surface from the second surface is calculated on the basis of the distance between the first and the second position as well as the said angular position.

In this variant of the measurement device, the distance between the first and the second position is therefore calculated, which distance corresponds directly to the thickness of the object to be measured, if this is correctly oriented relative to the first and second measurement sensor. If this condition does not apply, the angular position of the second surface is determined, and the distance between the first and the second position is "corrected" in accordance with the inclination that is determined.

In a preferred variant, the measurement device presented is built into a bending machine for bending of a plate-shaped object, particularly in a feed region for the plate-shaped object to be bent. In this way, the part to be bent (e.g. sheet metal) can be precisely measured, and the bending machine can be correctly set with regard to the pressing pressure and/or the displacement path, for the bent part thickness that has been determined, thereby making it possible to produce a number of bent parts with the same bending angle, even if their thickness varies.

Alternatively, the measurement device presented can be disposed in the region of a bending machine, so that a handling robot that lays parts to be bent into the bending machine holds these parts in the measurement device before they are fed into the bending machine, in order to determine the thickness of the part to be bent.

It is particularly advantageous if the first to fourth position is measured essentially at the same time. As a result, this measurement can take place very quickly, on the one hand; on the other hand, measurement errors resulting from movements of the body to be measured cannot occur, as is the case in methods in which multiple measurement points are determined sequentially.

At this point, it should be noted that the different embodiments of the measurement device presented, as well as the advantages that result from them, can also be applied analogously to the measurement method and vice versa.

Figure 2:
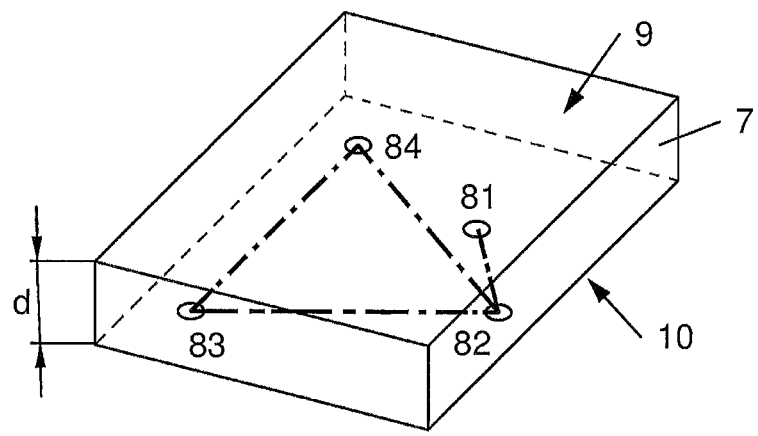
Figure 3:
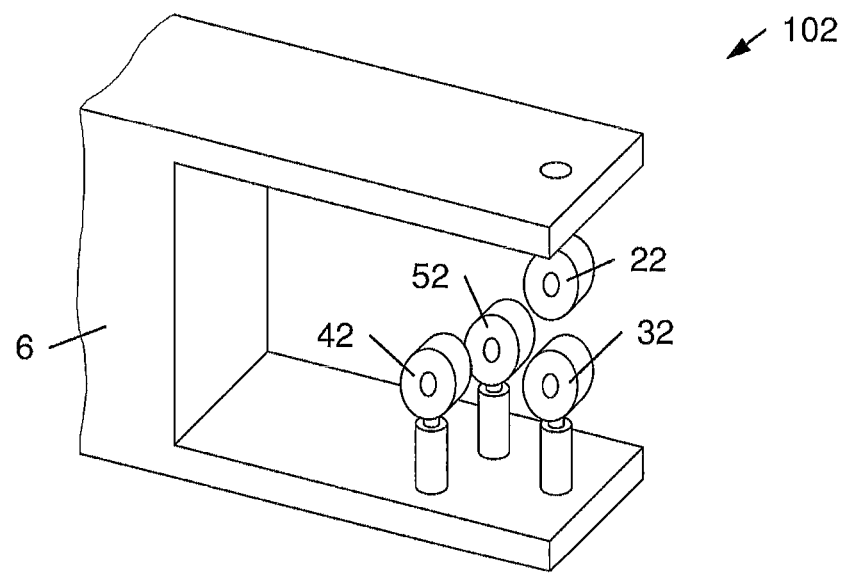
Figure 4:
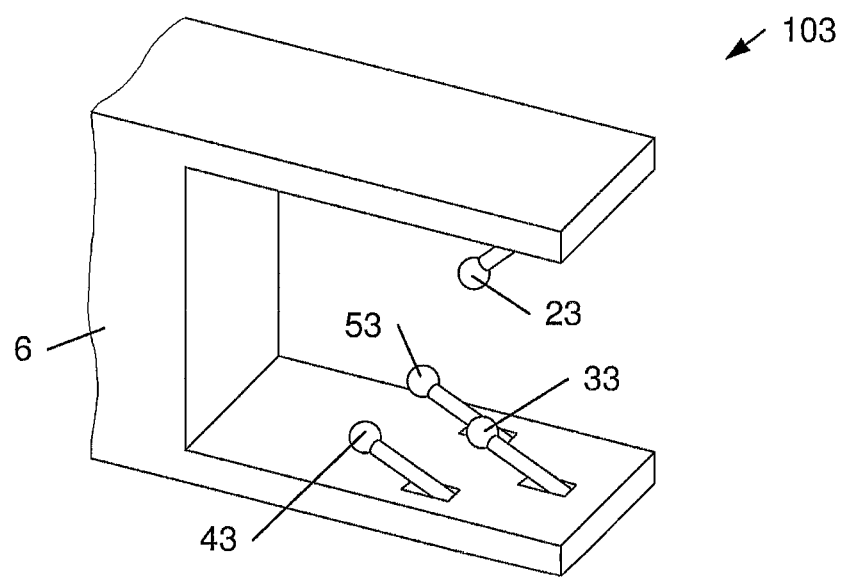
Figure 5:
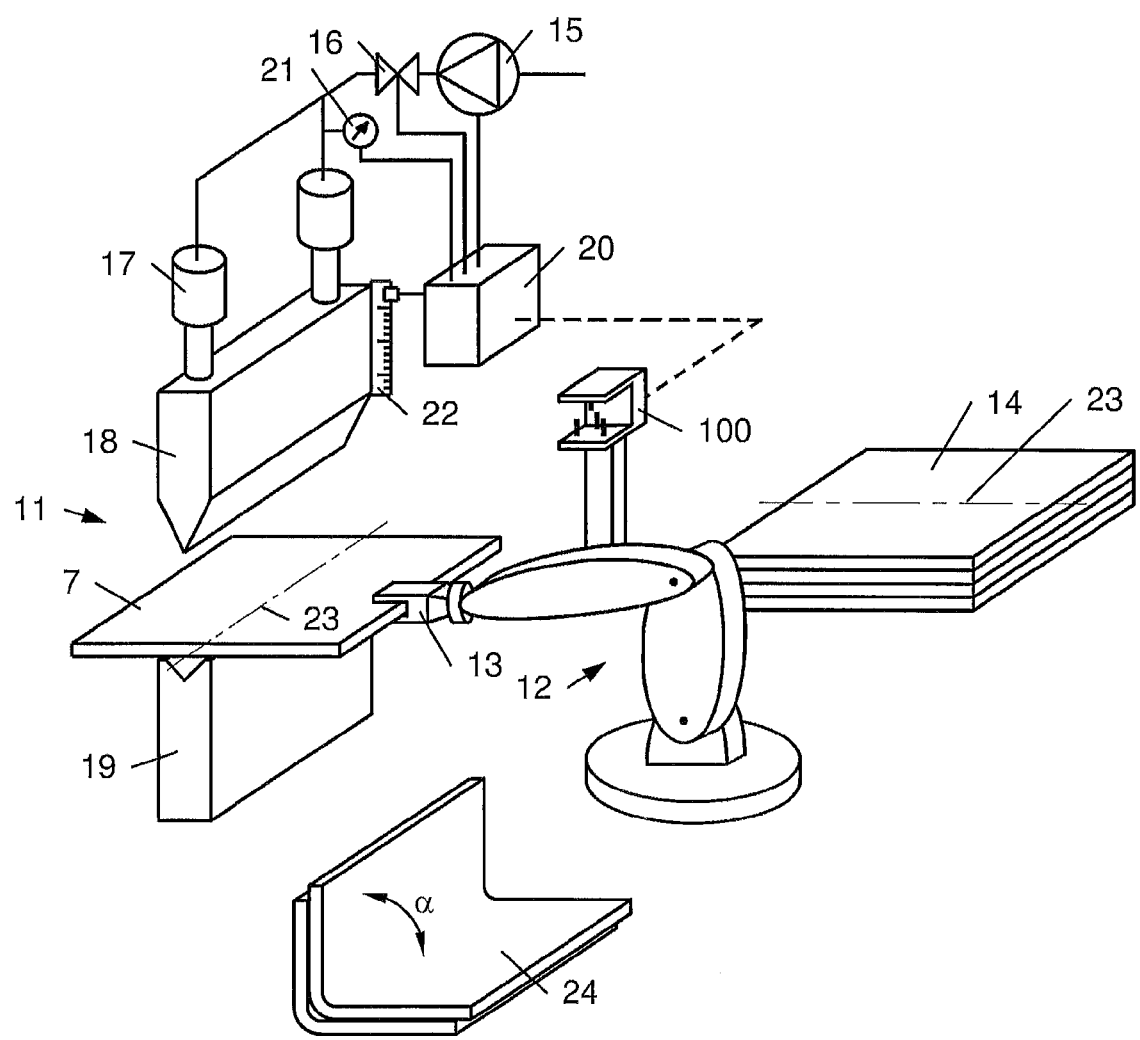

For a better understanding of the invention, it will be explained in greater detail, using the following figures. These show:

FIG. 1 a first schematically represented example of a measurement device having linearly displaceable measurement plungers;

FIG. 2 an exemplary placement of the contact points on an object to be measured;

FIG. 3 a second schematically represented example of a measurement device having rollers for scanning the object to be measured;

FIG. 4 a third schematically represented example of a measurement device having measurement levers mounted so as to rotate, and FIG. 5 a schematically represented arrangement having a bending press, a robot, and a measurement device.

As an introduction, it should be stated that in the different embodiments described, the same parts are provided with the same reference symbols or component designations, wherein the disclosures contained in the entire description can be transferred analogously to the same parts having the same reference symbols or component designations. Also, the position information selected in the description, such as, for example, at the top, at the bottom, at the side, etc. refers to the figure being directly described and shown, and must be transferred analogously to the new position if a change in position is made. Furthermore, individual characteristics or combinations of characteristics of the different exemplary embodiments that are shown and described can, in themselves, represent independent, inventive solutions or solutions according to the invention.

The measurement device and the measurement method will now be explained using FIGS. 1 and 2, where FIG. 1 shows a first schematically represented example of a measurement device 101 and FIG. 2 shows a plate-shaped object 7 to be measured.

The measurement device 101 for measuring the thickness d of the plate-shaped object 7 comprises:
- a first measurement sensor 21 for measuring a first position 81 of a contact point of the first measurement sensor 21 with a first surface 9 of the plate-shaped object 7,
- a second measurement sensor 31 for measuring a second position 82 of a contact point of the second measurement sensor 31 with a second surface 10 of the plate-shaped object 7, which lies opposite the first surface 9,
- a third measurement sensor 41 for measuring a third position 83 of a contact point of the third measurement sensor 41 with the second surface 10 of the plate-shaped object 7,
- a fourth measurement sensor 51 for measuring a fourth position 84 of a contact point of the fourth measurement sensor 51 with the second surface 10 of the plate-shaped object 7, wherein the positions 82 . . . 84 of the contact points of the second, third, and fourth measurement sensor 31 . . . 51 are spaced apart from one another, and
- a computer unit that is set up for calculating the thickness d of the plate-shaped object 7 on the basis of the measured first to fourth position 81 . . . 84, corresponding to the normal distance of the first surface 9 from the second surface 10.

In the present example, the first measurement sensor 21 is disposed on a first fork extension and the second to fourth measurement sensor 31 . . . 51 are disposed on a second fork extension of a fork-shaped holder 6. The measurement sensors 21 . . . 51 each have a linearly displaceable measurement plunger, the displacement directions of which are oriented parallel to one another. The axes of the measurement plungers of the first and the second measurement sensor 21, 31 furthermore lie on a straight line in this example.

The measurement plungers can be spring-loaded and, in this manner, be pressed onto the plate-shaped object 7. It is also conceivable that the measurement plungers can be moved out and in, for example pneumatically, hydraulically, by means of an electromagnet or a spindle drive. In general, it is advantageous if the thickness d of the plate-shaped object 7 is determined at a predeterminable plunger force or a predeterminable plunger pressure. In this way, reproducible measurement results can be achieved for the thickness d. For example, the plunger force can be set by means of predetermining a specific pressure of the pneumatic or hydraulic drive or by means of predetermining a specific current for the electromagnet or for the electric motor. In general, force sensors can also be built into measurement sensors 21 . . . 51 (for example piezo pressure sensors or strain gauges), in order to be able to determine the plunger forces that occur.

Using the measurement device 101, a very precise determination of the thickness d of the plate-shaped object 7 is now possible, because rotation or tilting of the measurement device 101 relative to the plate-shaped object 7 is taken into consideration. As can be clearly seen in FIG. 2, the connecting straight line between the first position 81 and the second position 82 is inclined relative to the second surface 10, the orientation of which is determined using the second to fourth position 82 . . . 84. Measurement according to conventional methods, which determines the distance between the first position 81 and the second position 82, would therefore not result in the thickness d of the plate-shaped object 7 that corresponds to the normal distance of the first surface 9 from the second surface 10, but rather a thickness that is greater as compared with the true value d.

Preferably, for the determination of the thickness d
- the distance between the first position 81 and the second position 82 is calculated,
- the angular position of the second surface 10 relative to a straight line that runs between the first position 81 and the second position 82 is calculated using the measured second to fourth position 82 . . . 84, and
- the normal distance of the first surface 9 from the second surface 10 (in other words the thickness d) is calculated using the distance between the first position 81 and the second position 82 as well as the said angular position.

For example, the true thickness d can be determined by way of $$d = x \cdot \cos(90-\alpha)$$

where x characterizes the distance between the first position 81 and the second position 82, and α the angle that is enclosed by the said straight line and the second surface 10.

It is particularly advantageous, in general, if the first to fourth position 81 . . . 84 are essentially measured at the same time. In this way, this measurement can take place very quickly, on the one hand, and on the other hand, measurement errors caused by movements of the body 7 to be measured also cannot occur, as is the case for methods in which multiple measurement points are determined sequentially.

FIG. 3 shows a further variant of a measurement device 102, in which the contact to the plate-shaped object 7 to be measured is produced by way of rollers 22 . . . 52. The rollers 22 . . . 52 are attached to plungers that are biased with a helical spring or with an air spring, for example. To be measured, the plate-shaped object 7 is simply pushed into the opening of the fork-shaped holder 6; moving the plungers out and in with motors is not absolutely necessary for this purpose.

FIG. 4 shows a further variant of a measurement device 103, in which the contact to the plate-shaped object 7 to be measured is produced by way of measurement levers 23 . . . 53 mounted so as to rotate, at the ends of which a spherically shaped thickened region (for example a ball made of ruby) is situated. Once again, the position 81 . . . 84 of the contact point with the plate-shaped object 7 to be measured can be precisely determined by way of the angle that a measurement lever 23 . . . 53 assumes while measuring, relative to the holder 6, and its length n, which is assumed to be known.

FIG. 5 shows a schematically represented arrangement having a bending press 11 for bending a plate-shaped object (bent part) 7, a robot 12 that is prepared for feeding the part 7 to be bent into the bending press 11, using a gripper 13, and a measurement device 100, which is disposed in a feed region for the part 7 to be bent.

In this example, the robot 12 takes an unbent part 7 to be bent from a stack 14 and lays it into the bending press 11 using its gripper 13. By means of activation of the hydraulic pump 15 or of a valve 16, the hydraulic cylinders 17 are put under pressure, whereupon the blade 18 moves downward in the direction of the die 19. The bending angle α can be influenced by means of controlling the pressing pressure and/or the movement path. For this purpose, the bending press 11 comprises a controller 20, which is connected with a manometer 21, a linear measurement system 22, as well as with the pump 15 or the valve 16. In this way, it is possible, in known manner, to predetermine/control any desired pressing pressure and any desired movement path for the blade 18, in order to thereby achieve a required reference bending angle, if possible.

At this point it should be noted that the terms "control" and "regulate" are used synonymously, unless stated otherwise. This means that regulation can also be provided in place of control, and vice versa, unless stated otherwise.

After bending, the part 7 that has been bent along the bending line 23, as shown in this example, is taken out of the bending press 11, using the gripper 13, and laid down onto a stack 24 or a further transport means (e.g. conveyor belt). In this manner, fully automated operation is achieved in the production of the bent part 7.

In order to keep the deviation between the actual bending angle α and the reference bending angle as low as possible, even in the case of tolerance-related variation of the thickness d of the parts 7 to be bent, the thickness d of the part 7 to be bent is determined before bending, using the measurement device 100 in the manner described above, and a pressing pressure and/or a movement path and/or a parameter of the bending press 11 dependent on that is influenced by the measured value of the thickness d of the part to be bent, in such a manner that a deviation between an actual bending angle α and a reference bending angle is reduced.

For this purpose, the robot 12 holds the unbent part 7 in the measurement device 100. The arrangement shown comprises means for transmitting a measured value of the thickness d of the part to be bent from the robot 12 to the bending press 11, in concrete terms to its controller 20 (see broken line).

Furthermore, the controller 20 is set up for influencing the pressing pressure and/or the movement path and/or a parameter of the bending press 11 that depends on it, by means of the measured value of the thickness d of the part to be bent, in such a manner that a deviation between an actual bending angle α and a reference bending angle is reduced.

In concrete terms, the thickness d of the part 7 to be bent is therefore determined, using the measurement device 100, before the part 7 is bent using the bending press 11. This measured value is transmitted to the controller 20 (e.g. in wired or wireless manner), which controller sets the pressing pressure and the movement path in accordance with the thickness d of the part to be bent and the reference bending angle to be achieved, in concrete terms, in this example. Specifically, the pressing pressure is increased with an increasing measured value for the thickness d of the part to be bent, and the movement path is shortened accordingly. In general, it is advantageous if the thickness d of the part to be bent is determined on or in the region of the bending line 23. In this way, bending of the part 7 to be bent can take place in particularly precise manner, because its thickness d is determined at the specific position at which it will be bent later.

By means of the aforesaid measure, a number of bent parts 7 having essentially the same actual bending angle α can be produced, even if their thickness d varies. Re-bending is therefore not necessary, or only in exceptional cases. Also, inspection of each bent part 7 can be eliminated, without having to risk problems in a fully automated production process.

In spite of the influence on the bending press 11 from the measured value of the thickness d of the part to be bent, it is advantageous if the deviation of the actual angle α of the bent part 7 from the reference angle is determined, and the influence on the bending press 11 from the measured value of the thickness d of the part to be bent is adapted in such a manner that a deviation between an actual bending angle α and a reference bending angle is reduced. Specifically, the pressing pressure is increased for the future parts 7 to be produced, if the actual bending angle α is too low, and the movement path is extended accordingly. As a result, the bending press 11 is constantly re-adjusted. Fundamentally, random-sample measurements are sufficient for this purpose, so that the production process is disrupted only slightly by this.

In FIG. 5, the measurement device 100 is disposed offset from the bending press 11. Of course, it is also possible that the measurement device 100 is an integral part of bending press 11. It is then advantageous that no separate movement of the robot 12 is required for measuring the thickness d of the part to be bent, because laying down the part 7 to be bent into the bending press 11, in the region of the measurement device 100, is sufficient.

The exemplary embodiments show possible embodiment variants of a measurement device 100 . . . 103 according to the invention as well as of use of the same, according to the invention, whereby it should be noted at this point that the invention is not restricted to the embodiment variants specifically shown, but rather, instead, various combinations of the individual embodiment variants with one another are possible, and this variation possibility lies within the ability of a person skilled in the art of this technical field, on the basis of the teaching for technical action provided by the present invention. Therefore all the conceivable embodiment variants that are possible by combining individual details of the embodiment variant that is shown and described are also covered by the scope of protection.

At this point, it is pointed out that the figures are drawn purely schematically and merely represent illustrative examples. Of course, the measurement sensors 21 . . . 53 of the measurement device 100 . . . 103 can also be disposed differently. For example, the first measurement sensor 21 . . . 23 can be disposed at the bottom instead of at the top, and the second to fourth measurement sensor 31 . . . 53 can be disposed at the top instead of at the bottom. Also, the fork-shaped holder 6 is by no means compulsory, the measurement sensors 21 . . . 53 can, of course, also be affixed to a holder having a different shape. Furthermore, the arrangement shown in FIG. 5 is also shown in highly schematic form, and can, in reality, comprise more or also fewer components than shown.

For the sake of good order, it is pointed out, in conclusion, that the components shown in the figures have been represented, in part, not to scale and/or enlarged and/or reduced in size, for a better understanding of their structure.

The task on which the independent inventive solutions are based can be derived from the description.

REFERENCE SYMBOL LIST

100 . . . 103 measurement device
21 . . . 23 first measurement sensor
31 . . . 33 second measurement sensor
41 . . . 43 third measurement sensor
51 . . . 53 fourth measurement sensor
6 holder
7 plate-shaped object (bent part)
81 . . . 84 first to fourth position
9 first surface
10 second surface
11 bending press
12 robot
13 gripper
14 stack of unbent parts to be bent
15 pump
16 valve
17 hydraulic cylinder
18 bending blade
19 bending die
20 controller
21 manometer
22 linear measurement system
23 bending line
24 stack of bent parts
α actual bending angle
d thickness

The invention claimed is:

1. A bending machine (11) for bending a plate-shaped object (7), having a measurement device (100 . . . 103) disposed in a feed region for the plate-shaped object to be bent, for measuring a thickness (d) of a plate-shaped object (7), comprising:
a first measurement sensor (21 . . . 23), which is set up for measuring a first position (81) of a contact point of the first measurement sensor (21 . . . 23) with a first surface (9) of the plate-shaped object (7),
a second measurement sensor (31 . . . 33), which is set up for measuring a second position (82) of a contact point of the second measurement sensor (31 . . . 33) with a second surface (10) of the plate-shaped object (7), which lies opposite to the first surface (9),
a third measurement sensor (41 . . . 43), which is set up for measuring a third position (83) of a contact point of the third measurement sensor (41 . . . 43) with the second surface (10) of the plate-shaped object (7),
a fourth measurement sensor (51 . . . 53), which is set up for measuring a fourth position (84) of a contact point of the fourth measurement sensor (51 . . . 53) with the second surface (10) of the plate-shaped object (7), wherein the positions (82 . . . 84) of the contact points of the second, third, and fourth measurement sensor (31 . . . 53) are spaced apart from one another and disposed in a triangle, and
a computer unit, which is set up for calculating the thickness (d) of the plate-shaped object (7), which corresponds to the normal distance of the first surface (9) from the second surface (10), on the basis of the first to fourth position (81 . . . 84), which are measured essentially at the same time.

2. The bending machine according to claim 1, comprising a fork-shaped holder (6), wherein the first measurement sensor (21 . . . 23) is disposed on a first fork extension, and the second to fourth measurement sensor (31 . . . 53) are disposed on a second fork extension.

3. The bending machine according to claim 1, wherein the measurement sensors (21 . . . 51, 22 . . . 52) each have a linearly displaceable measurement plunger, the displacement directions of which are oriented parallel to one another.

4. The bending machine according to claim 3, wherein the axes of the measurement plungers of the first and the second measurement sensor (21, 22, 51, 52) lie on a straight line.

5. The bending machine according to claim 1, wherein the computer unit is set up for
calculating the distance between the first position (81) and the second position (82),
calculating the angular position of the second surface (10) relative to a straight line that runs between the first position (81) and the second position (82), on the basis of the measured second to fourth position (82 . . . 84), and
calculating the normal distance of the first surface (9) from the second surface (10) on the basis of the distance between the first position (81) and the second position (82), as well as the said angular position.

6. A method for bending a plate-shaped object (7), in which a thickness (d) of the plate-shaped object (7) is measured, wherein a first position (81) of a contact point of a first measurement sensor (21 . . . 23) with a first surface (9) of the plate-shaped object (7) is measured,
comprising the steps
measuring a second position (82) of a contact point of a second measurement sensor (31 . . . 33) with a second surface (10) of the plate-shaped object (7), which lies opposite the first surface (9),
measuring a third position (83) of a contact point of a third measurement sensor (41 . . . 43) with the second surface (10) of the plate-shaped object (7),
measuring a fourth position (84) of a contact point of a fourth measurement sensor (51 . . . 53) with the second surface (10) of the plate-shaped object (7), wherein the positions (82 . . . 84) of the contact points of the second, third, and fourth measurement sensor (31 . . . 53) are spaced apart from one another and disposed in a triangle, and calculating the thickness (d) of the plate-shaped object (7), which corresponds to the normal distance of the first surface (9) from the second surface (10), on the basis of the measured first to fourth position (81 . . . 84), which are essentially measured at the same time.

7. Method according to claim 6, wherein the distance between the first position (81) and the second position (82) is calculated, the angular position of the second surface (10) relative to a straight line that runs between the first position (81) and the second position (82) is calculated on the basis of the measured second to fourth position (82 . . . 84), and the normal distance of the first surface (9) from the second surface (10) is calculated on the basis of the distance between the first position (81) and the second position (82), as well as the said angular position.

8. Method according to claim 6, wherein the first to fourth position (81 . . . 84) is essentially measured at the same time.

\* \* \* \* \*